(12) United States Patent
Acher et al.

(10) Patent No.: US 9,551,618 B2
(45) Date of Patent: Jan. 24, 2017

(54) WAVEFRONT-DIVISION POLARIMETRIC ANALYSIS METHOD AND DEVICE, SPECTROPOLARIMETER, POLARIMETRIC CAMERA AND OPTICAL MICROSCOPE USING SUCH A DEVICE

(71) Applicant: HORIBA JOBIN YVON SAS, Longjumeau (FR)

(72) Inventors: Olivier Acher, Gif sur Yvette (FR); Simon Richard, Villebon sur Yvette (FR); Thanh-Liem Nguyen, Meudon (FR)

(73) Assignee: HORIBA JOBIN YVON SAS, Longjumeau (FR)

( * ) Notice: Subject to any disclaimer, the term of this patent is extended or adjusted under 35 U.S.C. 154(b) by 82 days.

(21) Appl. No.: 14/417,618

(22) PCT Filed: Jul. 25, 2013

(86) PCT No.: PCT/FR2013/051804
§ 371 (c)(1),
(2) Date: Jan. 27, 2015

(87) PCT Pub. No.: WO2014/016528
PCT Pub. Date: Jan. 30, 2014

(65) Prior Publication Data
US 2015/0204724 A1    Jul. 23, 2015

(30) Foreign Application Priority Data
Jul. 27, 2012  (FR) ...................... 12 57329

(51) Int. Cl.
*G01J 4/00* (2006.01)
*G01J 4/02* (2006.01)
*G01J 4/04* (2006.01)

(52) U.S. Cl.
CPC ... *G01J 4/02* (2013.01); *G01J 4/04* (2013.01)

(58) Field of Classification Search
CPC ........................................................ G01J 4/00
(Continued)

(56) References Cited

U.S. PATENT DOCUMENTS

2003/0075676 A1 * 4/2003 Ruchet .................. G01J 4/02
250/225

FOREIGN PATENT DOCUMENTS

EP          1 519 170 A1    3/2005

OTHER PUBLICATIONS

International Search Report, dated Oct. 9, 2013, from corresponding PCT application.

* cited by examiner

*Primary Examiner* — Roy M Punnoose
(74) *Attorney, Agent, or Firm* — Young & Thompson (57) ABSTRACT

An accurate and robust wavefront-division polarimetric analysis method and device, allows the quasi-instantaneous measurement of the polarization states of a luminous object. The device can be used to produce a plurality of light beams, all polarized according to different polarization states, from a single upstream light beam. The polarized light beams, which do not overlap and which carry information items that are complementary in terms of polarization, are analyzed simultaneously by a plurality of detectors that measure the luminous intensity of each beam. Processing elements digitally process the luminous intensity values obtained in order to determine the polarization state of the upstream light beam. The operations performed by the processing elements prevent luminous intensity variations in the split light beams during the division of the wavefront of the upstream light beam. Therefore, the wavefront-division polarimetric analy- (Continued)

sis device is robust and its accuracy is not hindered by the experimental conditions.

20 Claims, 4 Drawing Sheets

WAVEFRONT-DIVISION POLARIMETRIC ANALYSIS METHOD AND DEVICE, SPECTROPOLARIMETER, POLARIMETRIC CAMERA AND OPTICAL MICROSCOPE USING SUCH A DEVICE

BACKGROUND OF THE INVENTION

The invention relates to a wavefront-division polarimetric analysis device allowing to determine the polarisation state of a light beam.

The invention more particularly relates to a wavefront-division polarimetric analysis device for determining the polarisation states of the different source-points of an object or a light beam.

The invention also relates to a spectrometer, a camera or a microscope equipped with such a device.

The invention finally relates to a wavefront-division polarimetric analysis method for determining the polarisation state of an upstream light beam.

Knowing the polarisation state of a light beam, an image or a light source proves to be important not only in many scientific instrumentation fields, as for example astronomy or microscopy, but also for many applications as target detection or automated vision.

For that purpose, different types of polarimetric analysis devices, or polarimeters, may be implemented. Among them, the wavefront-division polarimeters (also called "aperture-division" polarimeters) appear as being particularly interesting when the matter is to determine quasi-simultaneously the polarisation states of different points of an object.

DESCRIPTION OF THE RELATED ART

Such wavefront-division polarimeters are described for example in the documents US 2003/075676 and EP 1519170.

In the wavefront-division polarimeters, different images corresponding to the initial object are obtained by separating the wavefront and analysing in parallel the different images obtained in different polarisation states.

It is hence known from the document "*Spectrally resolving single-shot polarimeter*" (Knitter et al., in *Optics Letters*, Vol. 36, Issue 16, pp. 3048-3050, 2011) a wavefront-division polarimetric analysis device including a birefringent prism, a segmented polariser and an imaging spectrometer. This polarimeter produces, from a luminous object to be analysed, a plurality of images of this object, whose processing allows to determine the polarisation states of the latter.

However, this wavefront-division polarimeter has the drawback that the luminous intensity of each of the images formed strongly depends on the experimental conditions. Hence, the measured values of luminous intensity of each of the images depend not only on the polarisation state, but also on the distribution of luminous intensity at the place where the wavefront division is performed. The measurement of the polarisation state by means of this polarimeter is then imprecise and marred by errors.

SUMMARY OF THE INVENTION

To remedy the above-mentioned drawback of the state of the art, the present invention proposes an accurate and robust wavefront-division polarimetric analysis device allowing to measure quasi-instantaneously the polarisation states of a luminous object.

For that purpose, the invention relates to a wavefront-division polarimetric analysis device for determining the polarisation state of an upstream light beam coming from a light source.

According to the invention, the wavefront-division polarimetric analysis device includes:

means for dividing the wavefront of said upstream light beam, adapted to split said upstream light beam into N split light beams, where N is an integer higher than or equal to two, each of the N split light beams propagating along a direction of propagation forming an angle of deviation with the direction of propagation of the upstream light beam, the N deviation angles being all different, such that said N split light beams are angularly separated, polarisation modification means adapted to modify the polarisation state of each of said at least N−1 split light beams, such that said N split light beams are polarised according to polarisation states that are all different, polarisation separation means, arranged so as to intercept said N split light beams and adapted to generate, from each of said N split light beams, two light beams polarised according to two orthogonal polarisation states and along two different directions of propagation, so as to generate 2*N polarised light beams, a plurality of detectors intercepting said 2*N polarised light beams and arranged in such a manner that one detector intercepts only one of said 2*N polarised light beams, said plurality of detectors delivering 2*N signals relating to the luminous intensity of each of the 2*N polarised light beams intercepted by said detectors, and processing means adapted to collect said 2*N signals at the output of said plurality of detectors to determine the polarisation state of said upstream light beam from said luminous intensities of the 2*N polarised light beams.

The wavefront-division polarimetric analysis device according to the invention hence allows to produce, from an upstream light beam, a plurality of polarised light beams that do not overlap each other at the detectors and whose polarisation states are all different. These polarised light beams, which carry polarisation-complementary information, are analysed simultaneously by the plurality of detectors that measures the luminous intensity of each of them. The processing means can then perform operations on these different luminous intensities and perform a digital processing on the values obtained to determine the polarisation state of the upstream light beam.

According to the invention, the operations performed by the processing means on the values of the luminous intensities allow to free from the variations of luminous intensity of the split light beams during the division of wavefront of the upstream light beam.

The polarimetric analysis device according to the invention is hence robust, and its accuracy is not degraded by the experimental conditions.

According to the invention, the wavefront-division means and the polarisation modification means can be arranged in the polarimetric analysis device in such a manner that the wavefront-division means are placed upstream or downstream from the polarisation modification means.

Indeed, by symmetry, the two configurations are equivalent from an optical point of view and have the same technical advantages.

Besides, other advantageous and non-limitative characteristics of the device and/or method according to the invention are the following:

N is higher than or equal to three;

said wavefront-division means comprise at least N−1 prism(s) or at least N−1 lens(es);

said polarisation modification means comprise at least N−1 birefringent plates;

each of said polarisation modification means intercepts a fraction of said upstream light beam, this fraction being preferentially of the order of 1/N, and still more preferentially comprised between 1/(3*N) and (2*N+1)/(3*N);

said angles of deviation with the direction of propagation of the upstream light beam are comprised between −15° and +15°, preferentially between −7° and +7°;

said polarisation separation means comprise a Wollaston prism, a Rochon prism, a Sénarmont prism, a diffractive-wave plate or a polarisation-separation diffraction grating;

said wavefront-division polarimetric analysis device includes at least one optical imaging system placed between said upstream light beam and said wavefront-division means and/or between said polarisation separation means and said plurality of detectors;

said wavefront-division polarimetric analysis device includes a first optical imaging system placed between said upstream light beam and said wavefront-division means and a second optical imaging system placed between said polarisation separation means and said plurality of detectors, said polarimetric analysis device being such that:

N is equal to three, said wavefront-division means comprise two prisms, said polarisation modification means comprise two birefringent plates, said polarisation separation means comprise a Wollaston prism, said plurality of detectors forms a planar array of coplanar detectors, said first optical imaging system and said second optical imaging system are arranged is such a manner to form six images of said light source in the plane of said planar array of detectors, and said processing means are adapted to calculate the parameters of the Stokes vector of the upstream light beam from the six detected images.

The wavefront-division polarimetric analysis device according to the invention advantageously enters in the construction of a spectropolarimeter, a polarimetric camera or an optical microscope.

Hence, the invention also relates to:

a spectropolarimeter including a polarimetric analysis device according to the invention;

a polarimetric camera including a polarimetric analysis device according to the invention; and an optical microscope including a polarimetric analysis device according to the invention.

The invention finally relates to a wavefront-division polarimetric analysis method for determining the polarisation state of an upstream light beam, including the following steps:

forming, from said upstream light beam, using polarimetric analysis means, N pairs of two polarised light beams, said N pairs forming 2*N polarised light beams, said 2*N polarised light beams having different polarisation states, and said two polarised light beams of each pair having orthogonal polarisation states;

determining the luminous intensities of the 2*N polarised light beams, determining for each of the N pairs of two polarised light beams, the ratio $\delta_i$, where i=1, 2, . . . , N, between the difference and the sum of the luminous intensities of said two polarised light beams of the i-th pair to form a vector $\overline{\delta}$, from the ratios $\delta_i$, determining the Mueller matrix $\overline{M}$ of the polarimetric analysis means, determining the total luminous intensity $S_0$ of the polarised light beams, determining the reduced Stokes vector $\overline{s_r}$ by inverting the relation $\overline{\delta}=\overline{M}\overline{s_r}$, and deducing therefrom the polarisation state of the upstream light beam.

Embodiments of the invention will now be described in detail with reference to the appending drawings in which.

DETAILED DESCRIPTION OF THE INVENTION

First Embodiment

Figure 1:
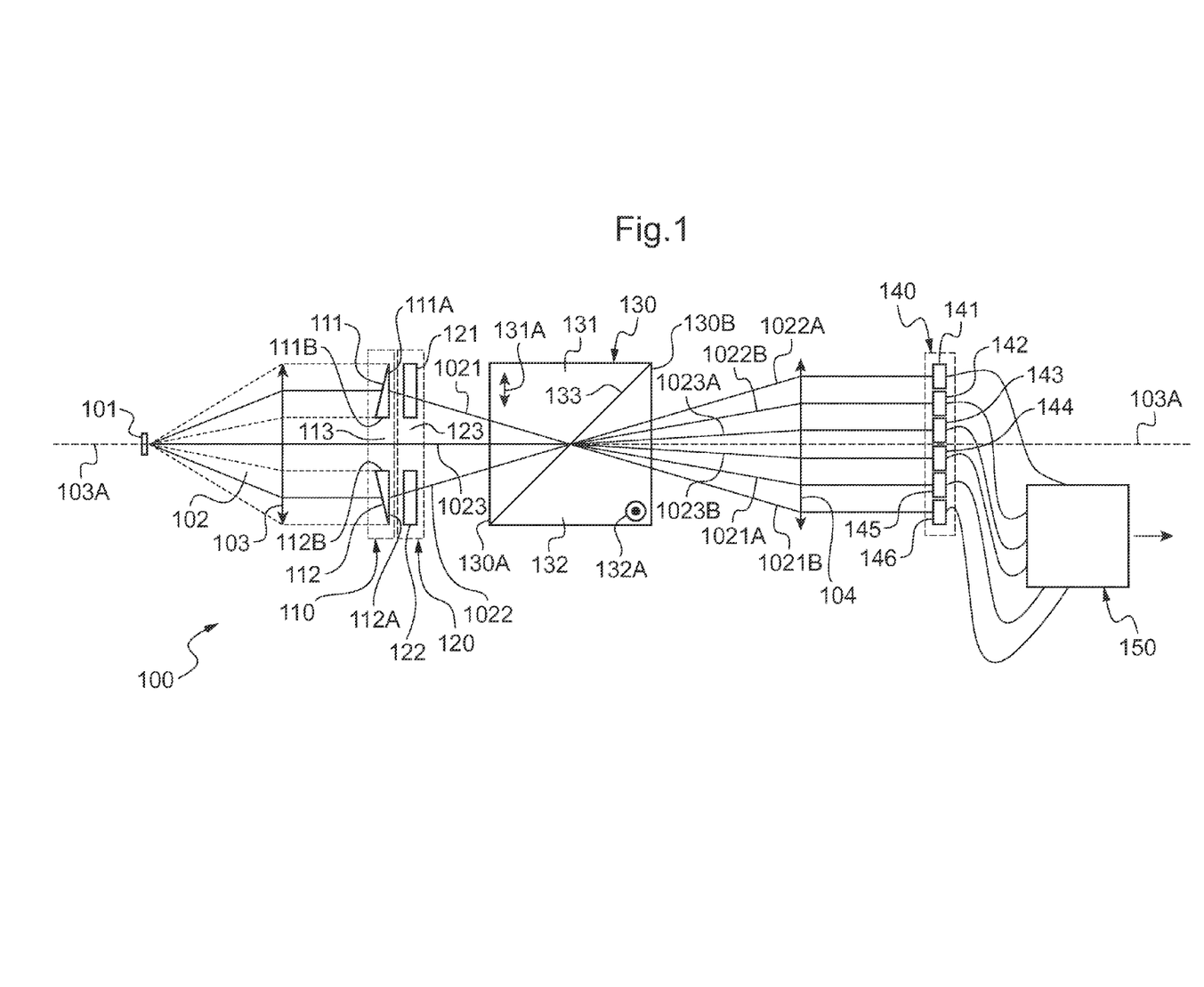
FIG. 1 is a schematic view of a first embodiment of a wavefront-division polarimetric analysis device used in an imaging spectropolarimeter according to a first embodiment of the invention.

FIG. 1 shows a first embodiment of a polarimetric analysis device 100 that can enter in the construction a spectropolarimeter allowing to determine, for different wavelengths of a given spectrum range, the polarisation state of an upstream light beam 102 coming from a light source herein formed by a source slot 101 of 150 micrometers (μm) width and 1 millimeters (mm) height.

The polarimetric analysis device 100 herein includes a first optical imaging system 103 allowing to collimate the upstream light beam 102. The first optical imaging system 103 is herein consisted of a first converging lens of focal length 30 mm placed in such a manner that the source point 101 is located at the object focal point of the first lens 103. The upstream light beam 102 is then transformed into a beam of rays that are all parallel to the optical axis 103A of the first lens 103. The wavefront of the light beam is hence formed of a planar wave (or of a superposition of planar waves, if the light beam is spectrally wide).

So modified, the upstream light beam 102 propagates parallel to the optical axis 103A. It is herein considered that the direction of propagation of the upstream light beam 102 is merged with the direction of the optical axis 103A.

The upstream light beam 102 is then incident on wavefront-division means 110 of the polarimetric analysis device 100.

The wavefront-division means 110 herein comprise two identical right prisms 111, 112, which are located on either side, and at equal distance, of the optical axis 103A.

The output faces 111A, 112A of the prisms 111, 112, respectively, are perpendicular to the optical axis 103A. The prisms 111, 112 are coplanar and oriented in the same way with respect to the optical axis 103A, such that their respective bases 111B, 112B face each other.

The apex angle of the prisms 111, 112 is equal to 10.5°. The prisms 111, 112 are herein prisms made of transparent mineral glass, for example of the BK7 type manufactured by the Schott Company and of refractive index 1.516 at the wavelength of 589 nanometers (nm). The prisms 111, 112 have no optical birefringence properties, i.e. the polarisation state of a light ray is not modified when the latter passes through one of the two prisms 111, 112.

The wavefront-division means 110 have also an aperture formed by the space 113 located between the two bases 111B, 112B of the two prisms 111, 112.

So arranged, the wavefront-division means 110 split the upstream light beam 102 by spatially separating the wavefront incident on the wavefront-division means 110.

Indeed, the light rays of the upstream light beam 102 that are incident on the first prism 111 pass through the first prism 111 to generate a first split light beam 1021, all rays of which are parallel to each other.

For reason of clarity, only the central light ray of the first split light beam 1021 has been shown in FIG. 1.

The portion of the light rays of the upstream light beam 102 that are incident on the first prim 111 are all deviated by the latter by an angle $\theta_D$ approximately equal to the product $(n_0-1)*Å$, where $n_0$ is the refractive index of the first prism, herein equal to 1.516, and A the apex angle of the first prism 111, herein equal to 10.5°. The angle $\theta_D$ is hence equal to about 5.3° (=(1.516-1)*10.5°).

The first base 111B being closer to the optical axis 103A than the first apex 111C, the deviation of the light rays is made so as to make the rays converge towards the optical axis 103A.

Hence, the first split light beam 1021 propagates along a direction of propagation forming a first angle of deviation equal to -5.3° with the direction of propagation of the upstream light beam 102.

Likewise, the light rays of the upstream light beam 102 that are incident to the second prism 112 pass through the second prism 112 to generate a second split light beam 1022, all rays of which are parallel to each other.

By analogy with the first split light beam 1021, the second split light beam 1022 propagates along a direction of propagation forming a second angle of deviation equal to 5.3° with the direction of propagation of the upstream light beam 102.

By symmetry of the prisms 111, 112 with respect to the optical axis 103A, the sign of the second angle of deviation is opposite to that of the first angle of deviation, so that the light rays of the second split light beam 1022 also converge towards the optical axis 103A.

The portion of the light rays of the upstream light beam 102 that is incident on the aperture 113 passes through the latter without being deviated to form a third split light beam 1023. The third split light beam 1023 propagates along a direction of propagation forming a third angle of deviation equal to 0° with the direction of propagation of the upstream light beam 102.

Hence, the three angles of deviation are all different from each other. Furthermore, the wavefront-division means 110 split the upstream light beam 102 in such a manner that the first, second and third split light beams 1021, 1022, 1023 are angularly separated.

Figure 2:
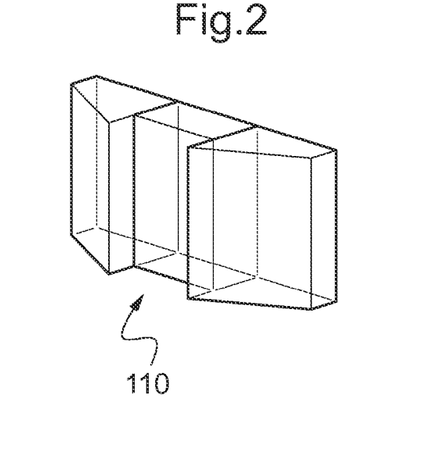
FIGS. 2 to 4 show examples of three-sided prisms that can be used as wavefront-division means in a polarimetric analysis device according to the invention.
Figure 3:
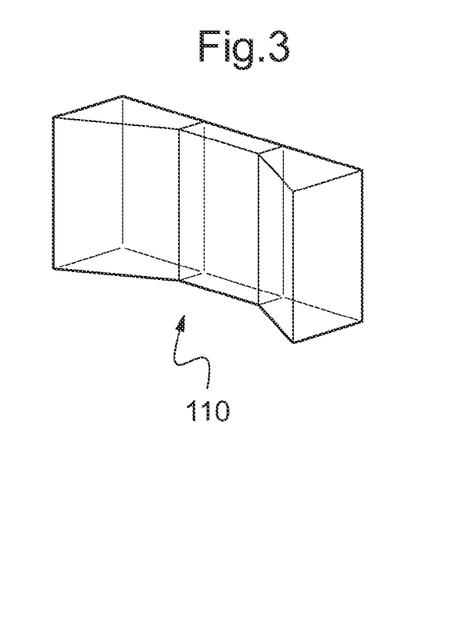
Figure 4:
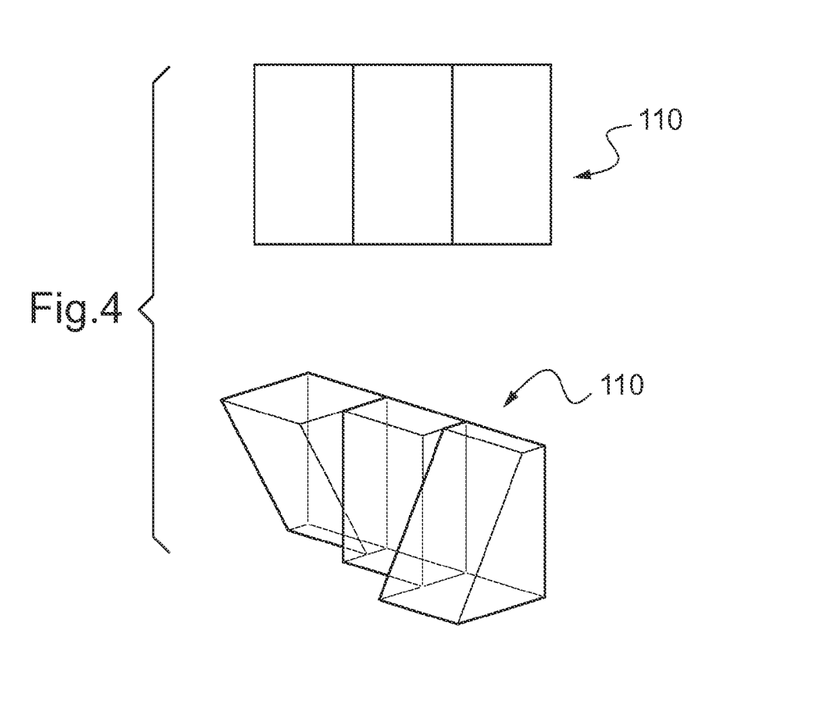

In other embodiments, the wavefront-division means can for example comprise a N-sided prism, exemplary embodiments of which are shown in FIGS. 2 to 4 in the case where N is equal to 3.

As a variant, the first converging lens and the N-sided prism could for example be replaced by N lenses located in the same plane and allowing to collimate N split light beams all having a different direction of propagation.

In another embodiment, the wavefront-division means can for example comprise two identical sets of two prisms attached to each other by their bases, so that two successive prisms differ from each other by their orientation.

As shown in FIG. 1, behind the wavefront-division means 110 are placed polarisation modification means 120 arranged so as to intercept the two split light beams 1021 and 1022. The polarisation modification means 120 herein comprise a first birefringent plate 121 and a second birefringent plate 122 placed behind the first prism 111 and the second prism 112, respectively, parallel to their respective output faces 111A, 112A.

The two birefringent plates 121, 122 are parallelepipedal in shape and are formed by a birefringent polymeric sheet.

As a variant, the polarisation modification means could for example comprise birefringent plates formed by a quartz plate.

As another variant, the polarisation modification means could comprise polarisation rotation films coating the input and output faces of the prisms.

For example, the first birefringent plate 121 is a quarter-wave retardation plate and the second birefringence plate 122 is a half-wave retardation plate. These retardation plates modify the polarisation state of the light beams that pass through them.

Hence, the polarisation state of the first split light beam 1021 is modified by the first birefringent plate 121 and the polarisation state of the second split light beam 1022 is modified by the second birefringent plate 122.

The delays introduced by each of the birefringent plates being different, the first and second split light beams 1021, 1022 are polarised according to different polarisation states.

The polarisation modification means 120 also comprise a blank aperture 123 located in the continuation of the aperture 113 of the wavefront-division means 110. The third split light beam 1023 propagating freely, its polarisation state is not modified by the polarisation modification means 120 when it passes through the aperture 123.

Hence, at the output of the polarisation modification means 120, the three split light beams 1021, 1022, 1023 have polarisation states that are all different.

Generally, the polarisation modification means 120 have low optical transmission losses, i.e. lower than 5%. These optical losses are independent of the polarisation states of the split light beams 1021, 1022 at the input of the polarisation modification means 120.

Hence, the polarisation modification means 120 keep the relative luminous intensities of the split light beams 1021, 1022, 1023 during their passage through the polarisation modification means 120.

It will be considered herein that the polarisation modification means 120 do not modify the luminous intensity of each of the split light beams 1021, 1022, 1023.

The polarimetric analysis device 100 shown in FIG. 1 also includes polarisation separation means 130 that herein comprise a Wollaston prism. This Wollaston prism 130 is placed upstream from the polarisation modification means 120, its input face 130A being perpendicular and centred to the optical axis 103A. So arranged, the polarisation separation means 130 intercept the first, second and third split light beams 1021, 1022, 1023, these latter being incident on the input face 130A of the Wollaston prism 130.

The Wollaston prism 130 is herein formed of two right prisms 131, 132 attached to each other at a planar interface of separation 133. The two prisms 131, 132 are herein formed of two calcite crystal prisms at 45°, whose optical axes 131A, 132A are orthogonal to each other. The angle of separation of this Wollaston prism 130 is herein equal to 2.65° (for the wavelength of 589 nm).

As a variant, the Wollaston prism could be for example formed of two prisms made of quartz, or of barium borate.

In the configuration shown in FIG. 1, the interface of separation 133 of the Wollaston prism 130 defines a plane of separation that is secant with the output plane containing the output faces 111A, 112A of the first and second prisms 111, 112 along a straight line that is parallel to the bases 111B, 112B of the first and second prisms 111, 112.

So oriented, the Wollaston prism 130 generates, from the first split light beam 1021 incident on the interface of separation 133, two polarised light beams 1021A, 1021B emerging by the output face 130B of the Wollaston prism 130.

The two polarised light beams 1021A, 1021B have the following optical characteristics:
  they are polarised according to two orthogonal polarisation states: these two polarisation states herein correspond to two linear polarisations, perpendicular to each other;
  they propagate along two different directions of propagation: these two directions of propagation are separated by the angle of separation of the Wollaston prism, i.e. herein 2.65°.

Likewise, the Wollaston prism 130 generates, from the second split light beam 1022 and the third split light beam 1023, respectively, each incident on the interface of separation 133, two polarised light beams 1022A, 1022B, and two polarised light beams 1023A, 1023B, emerging from the output face 130B of the Wollaston prism 130.

The two polarised light beams 1022A, 1022B (respectively two polarised light beams 1023A, 1023B) are polarised according to two linear polarisations, perpendicular to each other and propagating along two different directions of propagation separated by the angle of separation of the Wollaston prism 130.

Hence, the Wollaston prism 130 generates in total six polarised light beams 1021A, 1021B, 1022A, 1022B, 1023A, 1023B.

The angle of separation of the Wollaston prism 130 is such that the six polarised light beams 1021A, 1021B, 1022A, 1022B, 1023A, 1023B are spatially separated from each other and do not overlap each other.

As a variant, the polarisation separation means could for example comprise a Rochon prism, a Sénarmont prism, or a diffractive wave plate.

As another variant, the polarisation separation means could for example comprise a polarisation-separation diffraction grating (or polarisation grating), whose lines are oriented parallel to the plane of separation of the split light beams. The polarisation-separation diffraction grating separates a split light beam into two polarised light beams whose polarisation states are orthogonal to each other. One of the polarised light beams, which corresponds to the light beam diffracted for example in the order +1 of the diffraction grating, is polarised according to a left circular polarisation; the other polarised light beam, which corresponds to the light beam diffracted in the order −1, is polarised according to a right circular polarisation.

The six polarised light beams 1021A, 1021B, 1022A, 1022B, 1023A, 1023B are then taken by a second optical imaging system formed of a second converging lens 104 whose optical axis is merged with the optical axis 103A of the first converging lens 103.

The second converging lens 104, of focal length 20 mm, is placed along the optical axis 103A so that its object focal point is located on the interface of separation 133 of the Wollaston prism 130. The six polarised light beams 1021A, 1021B, 1022A, 1022B, 1023A, 1023B are hence refracted by the second lens 104 so that they emerge from the latter as six light beams forming six spatially separated images of the source slot 101 (see FIG. 1).

The above-described polarimetric analysis device 100 hence allows to form six images of the source slot 101, each of these images being 1.5 times smaller than the source slot 101 and separated by about 0.9 mm.

In the plane of these six images is placed a planar array of detectors 140 formed of a linear bar of six detectors 141 to 146. This plurality of detectors 140 intercepts the six polarised light beams 1021A, 1021B, 1022A, 1022B, 1023A, 1023B. The respective sizes and spacings of the six detectors 141 to 146 are such that one detector intercepts only one of the six polarised light beams 1021A, 1021B, 1022A, 1022B, 1023A, 1023B.

For example, as shown in FIG. 1, the first detector 141 intercepts the polarised light beam denoted 1022A, the second detector 142 intercepts the polarised light beam denoted 1023A, etc.

The six detectors 141 to 146 are detectors sensitive to the luminous intensity they receive. They hence each deliver a signal relating to the luminous intensity of the polarised light beam they intercept.

The six signals generated at the output of the plurality of detectors 141 to 146 are hence transmitted and collected by processing means 150 of the polarimetric analysis device 100.

It will be described hereinafter how the processing means 150 exploit the six signals collected to determine the polarisation state of the upstream light beam 102 from the luminous intensities of the six polarised light beams 1021A, 1021B, 1022A, 1022B, 1023A, 1023B.

Determination of the Polarisation State of the Upstream Light Beam

The respective luminous intensities of the six polarised light beams 1021A, 1021B, 1022A, 1022B, 1023A, 1023B will be noted respectively $I_{1,+}$, $I_{1,-}$, $I_{2,+}$, $I_{2,-}$, $I_{3,+}$, $I_{3,-}$.

The processing means 150 determine the magnitudes $\delta_1$, $\delta_2$ and $\delta_3$ defined by:

$$\delta_1 = [I_{1,+} - I_{1,-}]/[I_{1,+} + I_{1,-}]$$

$$\delta_2 = [I_{2,+} - I_{2,-}]/[I_{2,+} + I_{2,-}]$$

$$\delta_3 = [I_{3,+} - I_{3,-}]/[I_{3,+} + I_{3,-}]$$

These three magnitudes $\delta_1$, $\delta_2$ and $\delta_3$ are hence respectively associated with the three split light beams 1021, 1022, 1023, the polarisation states of the two split light beams 1021, 1022 having been modified by the birefringent plates 121 and 122, respectively.

The processing means 150 also determine the total intensity $I_{tot}$ by:

$$I_{tot} = I_{1,+} + I_{1,-} + I_{2,+} + I_{2,-} + I_{3,+} + I_{3,-}.$$

Generally, the polarisation state of the upstream light beam 102 is fully determined by the data of its Stokes vector $\overline{S}$, which may be written in the following reduced form:

$$\overline{S} = S_0 \begin{pmatrix} 1 \\ s_1 \\ s_2 \\ s_3 \end{pmatrix};$$

$S_0$ being equal to $I_{tot}$ and $$\overline{S}_r = \begin{pmatrix} s_1 \\ s_2 \\ s_3 \end{pmatrix}$$

being the reduced Stokes vector.

It may then be shown that:

$$\begin{pmatrix} \delta_1 \\ \delta_2 \\ \delta_3 \end{pmatrix} = \overline{\overline{M}} \begin{pmatrix} s_1 \\ s_2 \\ s_3 \end{pmatrix},$$

where $\overline{\overline{M}}$ is the Mueller matrix of the polarisation modification means 120:

$$\overline{\overline{M}} = \begin{pmatrix} m_{11} & m_{12} & m_{13} \\ m_{21} & m_{22} & m_{23} \\ m_{31} & m_{32} & m_{33} \end{pmatrix}.$$

It is meant by this that each line i (i=1 or 2) of the matrix $\overline{\overline{M}}$ is equal to ($m_{i1}$, $m_{i2}$ $m_{i3}$), the three coefficients $m_{i1}$, $m_{i2}$, $m_{i3}$ being the coefficients of the Mueller matrix of the first birefringent plate 121 (if i=1) or of the second birefringent plate 122 (if i=2).

The third line of the matrix $\overline{\overline{M}}$ is equal to (0 0 1), wherein no element modifies the polarisation of the third split beam 1023.

The coefficients of the Mueller matrices of the first and second birefringent plates may be measured with accuracy by means of an ellipsometer or a Mueller-meter.

As an alternative, by using the above-described polarimetric analysis device to measure the polarisation state of an upstream light beam whose Stokes vector, and hence its reduced Stokes vector, is otherwise known, the processing means deduce therefrom the coefficients of the Mueller matrix of the polarisation modification means.

The method implemented by the processing means 150 for the determination of the polarisation state of the upstream light beam 102 based on the luminous intensities of the polarised light beams 1021A, 1021B, 1022A, 1022B, 1023A, 1023B hence consists in:

determining, for each of the three split light beams 1021 (1022 and 1023, respectively), the ratio $\delta$ between the difference and the sum of the luminous intensities of the two polarised light beams 1021A, 1021B (1022A, 1022B and 1023A, 1023B, respectively), to form the vector $\overline{\delta}$, from the magnitude $\delta_i$, determining the Mueller matrix $\overline{\overline{M}}$ from the measurement of the Mueller matrices of each of the polarisation modification means 121, 122, and determining the total luminous intensity $S_0$ of the polarised light beams, determining the reduced Stokes vector $\overline{s}_r$ by inverting the relation $\overline{\delta} = \overline{\overline{M}} \overline{s}_r$, and deducing therefrom the Stokes vector, and hence the polarisation state, of the upstream light beam 102.

The advantage of this method is hence understood. Indeed, as the reduced Stokes vector $\overline{s}_r$ linearly depends on the magnitudes $\delta_i$, it is independent of the relative variations of luminous intensity of the different split light beams.

Advantageously, each of the polarisation modification means intercepts a fraction of the upstream light beam, this fraction being preferentially of the order of ⅓.

Preferably, this fraction may be comprised between ⅓ and ⅔.

Although it has been described in a configuration where there are only six polarised light beams, this method can be easily generalised to the case where 2*N polarised light beams are generated by the polarisation separation means.

The above-described polarimetric analysis device can enter in the construction of a spectropolarimeter. For that purpose, the array of detectors is replaced by an imaging spectrometer, for example the model CP140 manufactured by the Jobin Yvon Company, associated with a matrix array camera, so that the six images of the source slot are formed on the input slot of the imaging spectrometer.

The diffraction grating located in the imaging spectrometer creates in the plane of the six-spectrum matrix array camera, corresponding to the spectrum of each of the six images of the source slot. For each wavelength, the polarisation state of the upstream light beam is determined according to the preceding method.

Second Embodiment

Figure 5:
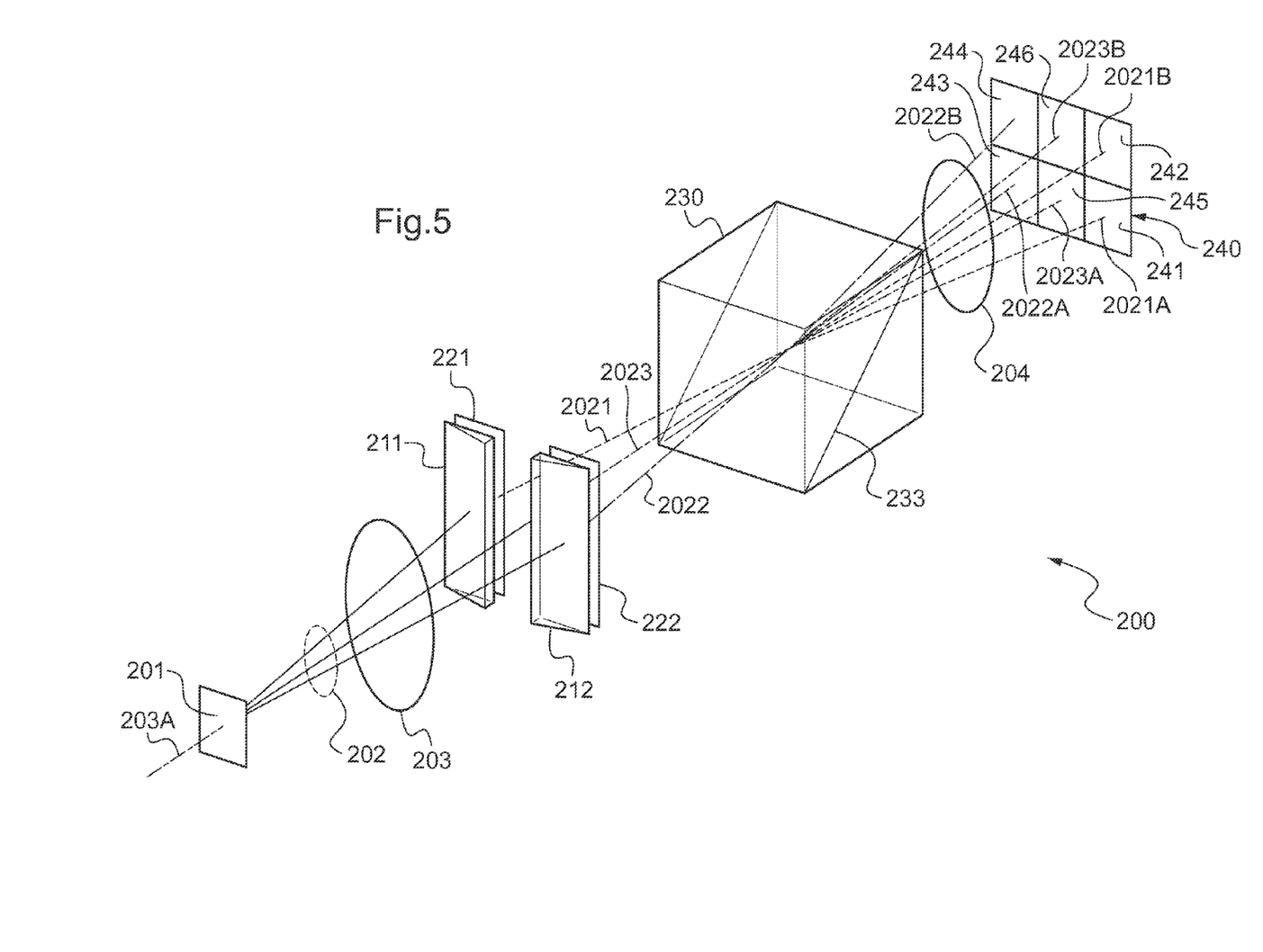
FIG. 5 is a schematic view of a second embodiment of a wavefront-division polarimetric analysis device used in a polarimetric camera according to a second embodiment of the invention.

In FIG. 5 is shown a polarimetric analysis device 200 according to a second embodiment of the invention. It will be seen hereinafter how this polarimetric analysis device 200 can enter in the construction of a polarimetric camera.

The polarimetric analysis device 200 is intended to determine the polarisation state of an image, a portion of which is considered, which is formed by the source point 201 from which comes an upstream light beam 202.

It can be observed that the polarimetric analysis device 200 shown in FIG. 5 is highly similar to the polarimetric analysis device 100 according to the first embodiment.

Indeed, the polarimetric analysis device 200 includes:

a first converging lens 203 of optical axis 203A, wavefront-division means also comprising two prisms 211, 212 symmetrical relative to the optical axis 203A, polarisation modification means also comprising a half-wave birefringent plate 221 and a quarter-wave birefringent plate 222, placed behind the two prisms 211, 212, respectively, polarisation separation means 230 also comprising a Wollaston prism, and a second converging lens 204 of optical axis 203A.

The polarimetric analysis device 200 differs from the polarimetric analysis device 100 of the first embodiment in that the Wollaston prism 230 has turned by an angle of 90° about the optical axis 203A, so that the interface of separation 233 of the Wollaston prism 230 defines a plane of separation that is secant with the output plane containing the output faces 211A, 212A of the first and second prisms 211, 212 along a straight line that is parallel to the bases 211B, 212B of the first and second prisms 211, 212.

So oriented, the Wollaston prism 230 separates each of the split light beams 2021, 2022, 2023 into two polarised light beams so as to generate six polarised light beams 2021A, 2021B, 2022A, 2022B, 2023A, 2023B distributed over several lines and several columns.

The polarimetric analysis device 200 further includes a planar array 240 of detectors 241 to 246, herein formed of a three-lines and two-columns array intercepting the six polarised light beams 2021A, 2021B, 2022A, 2022B, 2023A, 2023B.

As shown in FIG. 5, the detectors 241 to 246 are spatially distributed in such a manner that one detector intercepts only one of the six polarised light beams 2021A, 2021B, 2022A, 2022B, 2023A, 2023B to deliver six signals relating to the luminous intensity of each of these six intercepted beams.

The polarimetric analysis device 200 finally includes processing means (not shown) identical to the preceding ones, which collect the six output signals of the array of detectors 240 and determine the polarisation state of the upstream light beam 202 from the luminous intensities of the six polarised light beams 2021A, 2021B, 2022A, 2022B, 2023A, 2023B.

The polarimetric analysis device 200 of FIG. 5 may advantageously enter in the construction of a polarimetric camera to analyse the polarisation state of an image.

The polarimetric camera consists in a diaphragm, a three-sided prism such as that of FIG. 2, whose output faces of the inclined sides include polarisation-rotation films, a Wollaston prism and an imaging system (objective and camera). The image is placed by means of the first converging lens, so that the rays of the upstream light beam are collimated. The diaphragm allows to reduce the field of view so as to avoid the overlapping of images.

The three-sided prism provided with polarisation-rotation films reproduces the image in three copies, and modifies the polarisation states coming from two of the three copies, and deviate them in different directions.

The Wollaston prism then separates the two orthogonal linear polarisations in two different directions, preferably orthogonally to the separation of the three-sided prism.

The light being linearly polarised at the output of the Wollaston prism, it is possible to add a quarter-wave plate so as not to be hampered by the sensitivity to polarisation of the sensor.

Each copy of the same image having a different direction will be focused by means of the second converging lens to a different portion of a matrix array sensor of the CCD sensor type, for example.

The six images obtained have different polarisation information, which will be translated into luminous intensity differences.

An analysis by processing means will allow to extract the information about the polarisation state of the original image.

In another embodiment, the polarimetric analysis device can enter in the construction of an optical microscope to allow the measurement of the Jones vector of the light transmitted by a sample. Indeed, it is well known to define the Jones vector of a fully polarised beam from the Stokes vector thereof.

For that purpose, wavefront-division means and polarisation modification means are placed followed with a Wollaston prism between the rear focal plane of the objective and the tube lens of the optical microscope. In this configuration, the polarimetric analysis device includes a first optical imaging system formed of the microscope objective and a second optical imaging system formed by the tube lens, or by the tube lens associated with the objective of a digital camera of the CDD type, whose planar array of detector would then be placed in the image focal plane of the second optical imaging system.

Figure 6:
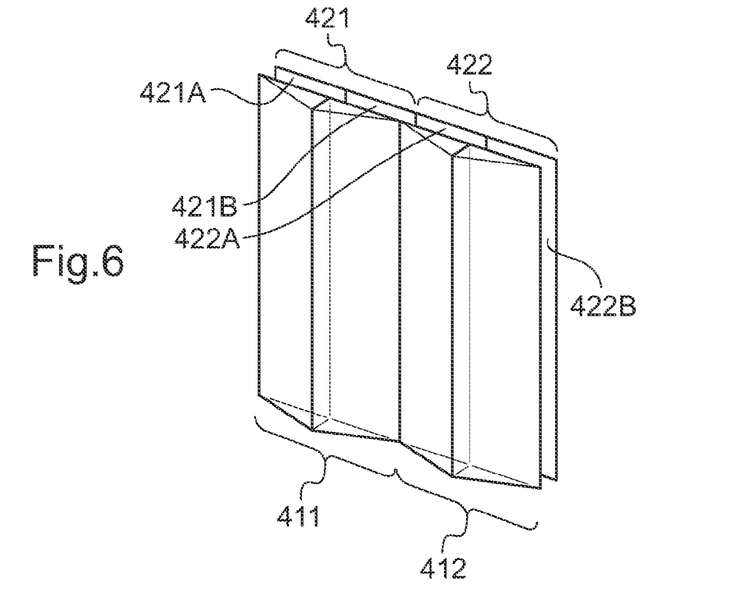
FIG. 6 shows an example of wavefront-division means comprising two repeated two-sided prisms on which are attached birefringent plates that can enter in the construction of an optical microscope.

It may be advantageous to use wavefront-division means and polarisation modification means such as those shown in FIG. 6. The wavefront-division means include two pairs of similar prisms 411, 412, attached by their bases. The polarisation modification means comprise two pairs of different birefringent plates, for example a plate of the A type 421A, 422A, which is for example a quarter-wave retardation plate, and a plate of the B type 421B, 422B, which is for example a half-wave retardation plate. The two A-type plates are attached to the output face of two prisms of same orientation, whereas the two B-type plates are attached to the output face of two other prisms of symmetrical orientation.

The fact that the wavefront-division means the polarisation modification means define several disjoint regions is useful to avoid the vignetting of the images. To reduce the observed field and to avoid that the four images overlap each other, it will advantageously be possible to limit the illuminated area by adjusting the field diaphragm of the illumination arm of the microscope, to illuminate only a reduced area.

Figure 7:
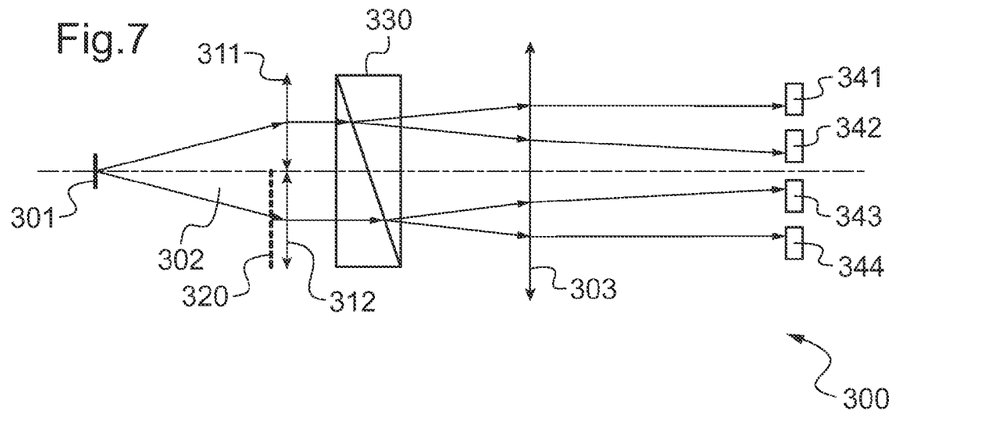
FIG. 7 shows a schematic view of another embodiment of the polarimetric analysis device in which the polarisation modification means are placed upstream from the wavefront-division means.

In another embodiment of the polarimetric analysis device 300 shown in FIG. 7, the polarisation modification means 320 are placed upstream from the wavefront-division means.

The polarisation modification means 320 herein comprise a single birefringent plate modifying uniformly the polarisation state of the rays of an upstream light beam 302 without modifying their luminous intensity. The upstream light beam 302 comes from an object slot 301.

The wavefront-division means comprise a first 311 and a second 312 thin converging lenses, of same focal distance, placed side by side, in a same plane located behind the birefringent plate 320 so that the second lens 312 intercepts all the rays of the upstream light beam 302 having passed through the birefringent plate 320.

The polarisation analysis device 300 also includes a Wollaston prism 330 making a second separation of the split light beams and a third lens 303 that allows to form four images of the object slot 301 in its focal plane that contains four detectors 341, 342, 343, 344 measuring the luminous intensity of each of the polarised light beams. Processing means (not shown) analyse these measurements to determine the polarisation state of the upstream light beam 302.

The invention claimed is:

1. A wavefront-division polarimetric analysis device to determine the polarisation state of an upstream light beam coming from a light source, comprising:
    means for dividing the wavefront of said upstream light beam, adapted to split said upstream light beam into N split light beams, where N is an integer higher than or equal to two, each of the N split light beams propagating along a direction of propagation forming an angle of deviation with the direction of propagation of the upstream light beam, the N deviation angles being all different, such that said N split light beams are angularly separated,
    polarisation modification means adapted to modify the polarisation state of each of said at least (N−1) split light beams, such that said N split light beams are polarised according to polarisation states that are all different,
    polarisation separation means, arranged so as to intercept said N split light beams, and adapted to generate, from each of said N split light beams, two light beams polarised according to two orthogonal polarisation states and along two different directions of propagation, so as to generate 2*N polarised light beams, a plurality of detectors intercepting said 2*N polarised light beams and arranged in such a manner that one detector intercepts only one of said 2*N polarised light beams, said plurality of detectors delivering 2*N signals relating to the luminous intensity of each of the 2*N polarised light beams intercepted by said detectors, and processing means adapted to collect said 2*N signals at the output of said plurality of detectors to determine the polarisation state of said upstream light beam from said luminous intensities of the 2*N polarised light beams.

2. The wavefront-division polarimetric analysis device according to claim 1, wherein said wavefront-division means comprise at least N−1 prism(s) or at least N−1 lens (311, 312).

3. The wavefront-division polarimetric analysis device according to claim 2, wherein said polarisation modification means comprise at least N−1 birefringent plate(s).

4. The wavefront-division polarimetric analysis device according to claim 2, wherein each of said polarisation modification means intercepts a fraction of said upstream light beam, this fraction being preferentially of the order of 1/N, and still more preferentially comprised between 1/(3*N) and (2*N+1)/(3*N).

5. The wavefront-division polarimetric analysis device according to claim 2, wherein said angles of deviation with the direction of propagation of the upstream light beam are comprised between −15° and +15°, preferentially between −7° and +7°.

6. The wavefront-division polarimetric analysis device according to claim 2, wherein the polarisation separation means comprise a Wollaston prism, a Rochon prism, a Sénarmont prism, a diffractive-wave plate or a polarisation-separation diffraction grating.

7. The wavefront-division polarimetric analysis device according to claim 2, comprising at least one optical imaging system placed between the upstream light beam and said wavefront-division means and/or between said polarisation separation means and said plurality of detectors.

8. The wavefront-division polarimetric analysis device according to claim 7, including a first optical imaging system, placed between said upstream light beam and said wavefront-division means and a second optical imaging system placed between said polarisation separation means and said plurality of detectors, and wherein:
N is equal to three,
said wavefront-division means comprise two prisms,
said polarisation modification means comprise two birefringent plates,
said polarisation separation means comprise a Wollaston prism,
said plurality of detectors, form a planar array of coplanar detectors,
said first optical imaging system and said second optical imaging system are arranged is such a manner to form six images of said light source in the plane of said planar array of detectors, and
said processing means are adapted to calculate the parameters of the Stokes vector of the upstream light beam from the six detected images.

9. The wavefront-division polarimetric analysis device according to claim 1, wherein said polarisation modification means comprise at least N−1 birefringent plate(s).

10. The wavefront-division polarimetric analysis device according to claim 9, wherein each of said polarisation modification means intercepts a fraction of said upstream light beam, this fraction being preferentially of the order of 1/N, and still more preferentially comprised between 1/(3*N) and (2*N+1)/(3*N).

11. The wavefront-division polarimetric analysis device according to claim 9, wherein said angles of deviation with the direction of propagation of the upstream light beam are comprised between −15° and +15°, preferentially between −7° and +7°.

12. The wavefront-division polarimetric analysis device according to claim 1, wherein each of said polarisation modification means intercepts a fraction of said upstream light beam, this fraction being preferentially of the order of 1/N, and still more preferentially comprised between 1/(3*N) and (2*N+1)/(3*N).

13. The wavefront-division polarimetric analysis device according to claim 1, wherein said angles of deviation with the direction of propagation of the upstream light beam are comprised between −15° and +15°, preferentially between −7° and +7°.

14. The wavefront-division polarimetric analysis device according to claim 1, wherein the polarisation separation means comprise a Wollaston prism, a Rochon prism, a Sénarmont prism, a diffractive-wave plate or a polarisation-separation diffraction grating.

15. The wavefront-division polarimetric analysis device according to claim 1, comprising at least one optical imaging system placed between the upstream light beam and said wavefront-division means and/or between said polarisation separation means and said plurality of detectors.

16. The wavefront-division polarimetric analysis device according to claim 15, including a first optical imaging system, placed between said upstream light beam and said wavefront-division means and a second optical imaging system placed between said polarisation separation means and said plurality of detectors, and wherein:
N is equal to three,
said wavefront-division means comprise two prisms,
said polarisation modification means comprise two birefringent plates,
said polarisation separation means comprise a Wollaston prism,
said plurality of detectors, form a planar array of coplanar detectors,
said first optical imaging system and said second optical imaging system are arranged is such a manner to form six images of said light source in the plane of said planar array of detectors, and
said processing means are adapted to calculate the parameters of the Stokes vector of the upstream light beam from the six detected images.

17. A spectropolarimeter including a polarimetric analysis device according to claim 1.

18. A polarimetric camera including a polarimetric analysis device according to claim 1.

19. An optical microscope including a polarimetric analysis device according to claim 1.

20. A wavefront-division polarimetric analysis method for determining the polarisation state of an upstream light beam, including the following steps:
using a wavefront-division polarimetric analysis device comprising i) means for dividing the wavefront of said upstream light beam, adapted to split said upstream light beam into N split light beams, where N is an integer higher than or equal to two, each of the N split light beams propagating along a direction of propagation forming an angle of deviation with the direction of propagation of the upstream light beam, the N deviation angles being all different, such that said N split light beams are angularly separated, ii) polarisation modification means adapted to modify the polarisation state of each of said at least (N−1) split light beams, such that said N split light beams are polarised according to polarisation states that are all different, iii) polarisation separation means, arranged so as to intercept said N split light beams, and adapted to generate, from each of said N split light beams, two light beams polarised according to two orthogonal polarisation states and along two different directions of propagation, so as to generate 2*N polarised light beams, iv) a plurality of detectors intercepting said 2*N polarised light beams and arranged in such a manner that one detector intercepts only one of said 2*N polarised light beams, said plurality of detectors delivering 2*N signals relating to the luminous intensity of each of the 2*N polarised light beams intercepted by said detectors, and v) processing means adapted to collect said 2*N signals at the output of said plurality of detectors to determine the polarisation state of said upstream light beam from said luminous intensities of the 2*N polarised light beams, forming, from said upstream light beam, N pairs of two polarised light beams, said N pairs forming 2*N polarised light beams, said 2*N polarised light beams having different polarisation states, and said two polarised light beams of each pair having orthogonal polarisation states;

determining the luminous intensities of the 2*N polarised light beams, determining for each of the N pairs of two polarised light beams, the ratio $\delta_i$, where i=1, 2, . . . , N, between the difference and the sum of the luminous intensities of said two polarised light beams of the i-th pair to form a vector $\overline{\delta}$, from the ratios $\delta_i$, determining the Mueller matrix $\overline{M}$ of the polarimetric analysis means, determining the total luminous intensity $S_0$ of the 2*N polarised light beams, determining the reduced Stokes vector $\overline{s_r}$ by inverting the relation $\overline{\delta}=\overline{M}\overline{s_r}$, and deducing therefrom the polarisation state of the upstream light beam.

* * * * *